(12) United States Patent
Saka (10) Patent No.: US 7,519,910 B2
(45) Date of Patent: Apr. 14, 2009

(54) METHOD FOR TRANSFERRING FILES FROM ONE MACHINE TO ANOTHER USING ADJACENT DESKTOP DISPLAYS IN A VIRTUAL NETWORK

(75) Inventor: Oluyemi Babatunde Saka, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 10/268,286

(22) Filed: Oct. 10, 2002

(65) Prior Publication Data

US 2004/0070608 A1    Apr. 15, 2004

(51) Int. Cl.
*G06F 3/00* (2006.01)

(52) U.S. Cl. .................... 715/748; 715/733; 715/769

(58) Field of Classification Search ............ 715/748, 715/769, 733, 735, 738, 739, 764, 770; 709/217, 709/219, 231
See application file for complete search history.

(56) References Cited

U.S. PATENT DOCUMENTS

| | | | |
|---|---|---|---|
| 5,313,646 A | 5/1994 | Hendricks et al. ........... 395/600 |
| 5,603,019 A | 2/1997 | Kish ........................... 395/621 |
| 6,006,248 A * | 12/1999 | Nagae ......................... 718/105 |
| 6,085,199 A | 7/2000 | Rose ........................... 707/104 |
| 6,151,021 A * | 11/2000 | Berquist et al. ............. 715/764 |
| 6,298,045 B1 * | 10/2001 | Pang et al. ................... 370/261 |
| 6,356,863 B1 | 3/2002 | Sayle ........................... 703/27 |
| 6,499,056 B1 * | 12/2002 | Kitamura et al. ............ 709/213 |
| 6,710,788 B1 * | 3/2004 | Freach et al. ............... 715/778 |
| 6,963,908 B1 * | 11/2005 | Lynch et al. ................ 709/220 |
| 2002/0194035 A1 * | 12/2002 | DiRienzo ...................... 705/4 |
| 2003/0028610 A1 * | 2/2003 | Pearson ....................... 709/213 |

\* cited by examiner

*Primary Examiner*—Kieu D Vu
(74) *Attorney, Agent, or Firm*—Yee & Associates, P.C.; David A. Mims, Jr.

(57) ABSTRACT

An apparatus and method for transferring files between a plurality of computers in a virtual network is disclosed. The present invention allows the selective transference of files between designated computers in a virtual network. The computers contain a VNRS program that allows a computer to display another computer's desktop next to its own. Although the two computers are not physically connected, the present invention allows files to be transferred from the first computer to the second computer and vice versa by merely dragging and dropping icons from one desktop to another.

2 Claims, 8 Drawing Sheets

METHOD FOR TRANSFERRING FILES FROM ONE MACHINE TO ANOTHER USING ADJACENT DESKTOP DISPLAYS IN A VIRTUAL NETWORK

CROSS REFERENCE TO RELATED APPLICATIONS

The present application is related to the subject matter of U.S. patent application Ser. No. 10/268,260, incorporated herein by reference.

FIELD OF THE INVENTION

The present invention is related generally to the field of computers and specifically to the remote control of computers in a virtual network.

BACKGROUND OF THE INVENTION

It is often desirable to transfer files between a plurality of computers. Present systems allow file transfer between computers but only when the two computers are either physically connected (i.e. through their serial or USB ports) or connected to the same local area network (LAN) or wide area network (WAN). For example IBM Tivoli Remote Control permits control of a remote machine. Symantec PC Anywhere permits a user to connect to other computers or servers in order to transfer files or run applications. Win2VNC allows the operator to use two screens on two different computers as if they were connected to the same computer but does not permit transfer of files. Virtual Network Computing (VNC) is a remote display system which allows a user to view a computing desktop running on a first machine on any other machine connected to the first machine by the Internet.

Figure 1:
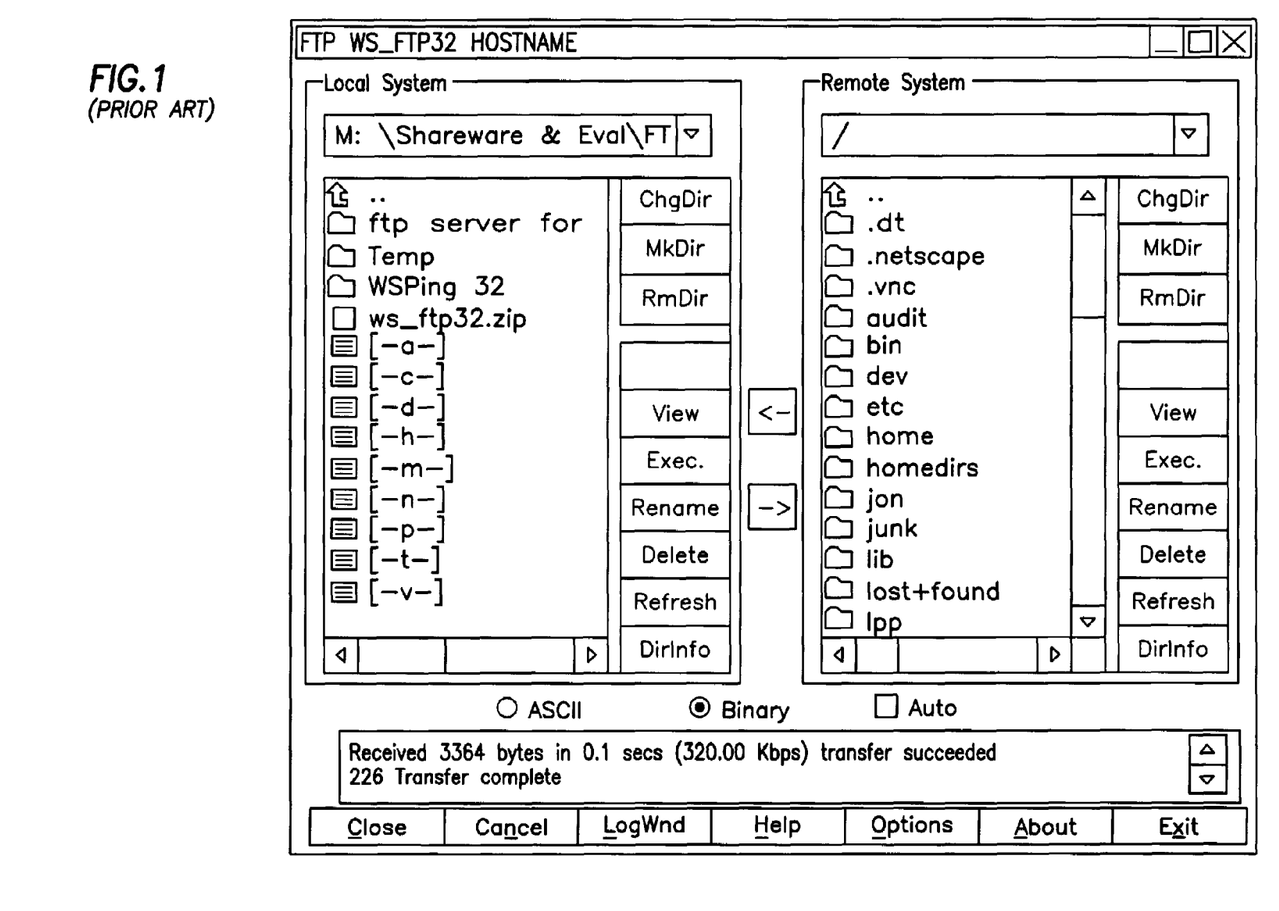
FIG. 1 depicts prior art file transfer display.

FIG. 1 is an illustration of the display of a prior art file transfer program. The screen is divided into two sections representing the file storage capacity of a first computer and a second computer. In the prior art embodiments, the user highlights a target file or folder in the first computer and a recipient drive or folder in the second computer. The user then clicks the arrow button in the center of the screen to move the file or folder from one location to another. The process may be repeated in reverse to transfer files from the second computer to the first computer. The user may also perform other file management actions (i.e. delete and rename files) using the display in FIG. 1. However, the file transfer program in FIG. 1 is limited in that the two computers must be either physically connected or connected to the same LAN. The prior art does not disclose a file transfer program for transferring files between computers connected via a virtual network. The current method of file transfer between computers in different domains is by email or by copying the file onto a floppy disk. However, both of these methods become labor intensive as the number of files to be transferred increases.

Much of the prior art is devoted to file transfer and maintenance programs. U.S. Pat. No. 6,356,863 entitled "virtual network file server" discloses an improved method and apparatus for transferring files amongst a plurality of computers which uses less disk space than traditional means. However, what is needed beyond the '863 patent is a file transfer method that is more user friendly and adaptable to computers in different domains in a virtual network.

U.S. Pat. No. 6,085,199 entitled "method for distributing a file in a plurality of different file formats" discloses an apparatus and method for transferring files to a plurality of computers in a plurality of different file formats. What is needed beyond the '199 patent is a file transfer method that is more user friendly and adaptable to computers in different domains in a virtual network.

U.S. Pat. No. 5,603,019 entitled "takeover technique for networked virtual file systems" discloses a method and apparatus for communicating across file systems. What is needed beyond the '019 patent is an apparatus and method for file maintenance that is more user friendly and adaptable to computers in different domains in a virtual network.

U.S. Pat. No. 5,313,646 entitled "method and apparatus for translucent file system" discloses a file system hierarchy for organizing files. What is needed beyond the '646 patent is a file transfer method that is more user friendly and adaptable to computers in different domains in a virtual network.

Furthermore, a need exists for a file transfer method that will allow a user to transfer files between computers with a minimal amount of hardware. Specifically, a need exists for a file transfer program that will allow a user to maintain and transfer files between a plurality of computers when the remote computers do not have any data entry devices (mice, keyboards, etc.).

Consequently, a system is desired that will allow transfer of files between computers that do not reside under the same domain. Moreover, a system is desired that will not require the files to be copied onto a floppy disk for transfer. In addition, a system is desired that will minimize the hardware needed to transfer the files.

SUMMARY OF THE INVENTION

The system that meets the needs identified above is Virtual Network Resource Sharing (VNRS). VNRS is a methodology to share files between multiple non-physically connected computers. To be part of the VNRS methodology, a computer must have the VNRS program in memory, be connected to a network, have an IP address, and elect to participate in the VNRS network. The VNRS program has a setup program, an interrogation program, a transfer program, a file index program, and a configuration program. Each participating computer is connected by its IP address. A first computer will serve as the host computer and a plurality of second computers will be client computers. Each participating computer is capable of being a host computer. Each of the computers in the VNRS system must be connected individually to a network; however, each of the computers need not be connected to the same network. When a connection is established, an exact copy of the client computers' desktop appears on the host computer. The host may then copy, move, rename or otherwise maintain the files between the host computer and the client computer. Moreover, the present invention includes a more user-friendly display that allows a user to transfer a file between the two computers by simply moving the file icon from the second computer desktop to the adjacent first computer desktop.

DETAILED DESCRIPTION OF THE PREFERRED EMBODIMENT

As used herein, the term Internet Protocol (IP) means a protocol used to route data from its source to its destination in an Internet, Local Area Network (LAN) or Wide Area Network (WAN) environment.

As used herein, the term domain means the part of a computer network in which the data processing resources are under common control.

As used herein, the term virtual network means a network that has no physical connection between computers and the connection is established by means of an IP address.

As used herein the term physically connected network means a network where two or more computers are connected via direct cable and local area network.

As used herein, the term IP address means a unique code assigned to each device or workstation connected to a network.

As used herein, the terms computer and machine refer to nay analog or digital processing device and are used interchangeably.

Figure 2:
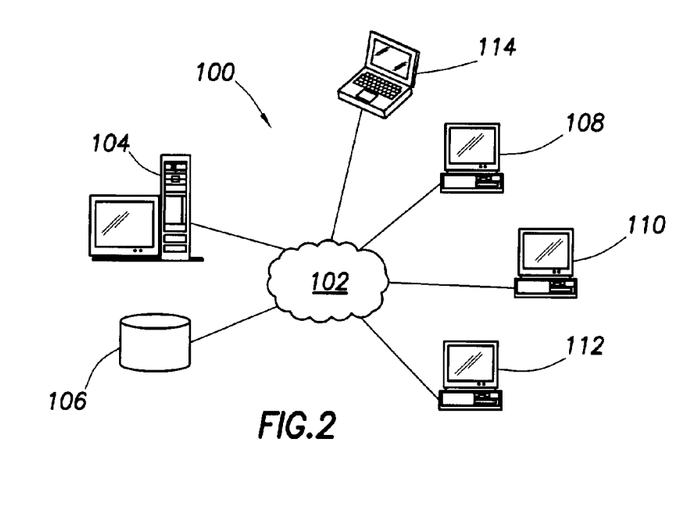
FIG. 2 is an illustration of a distributed data network.

FIG. 2 depicts a pictorial representation of a distributed data processing system 100 in which the present invention may be implemented and is intended as an example, and not as an architectural limitation, for the processes of the present invention. Distributed data processing system 100 is a network of computers which contains a network 102, which is the medium used to provide communication links between the various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110, 112, and 114 also are connected to a network 102. Clients 108, 110, 112, and 114 may be, for example, personal computers or network computers and may be desktops, laptops, or servers.

For purposes of this application, a network computer is any computer, coupled to a network, which receives a program or other application from another computer coupled to the network. In the depicted example, server 104 provides applications to clients 108, 110, 112, and 114. Clients 108, 110, 112, and 114 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as, an intranet, a local area network (LAN), or a wide area network (WAN).

Figure 3:
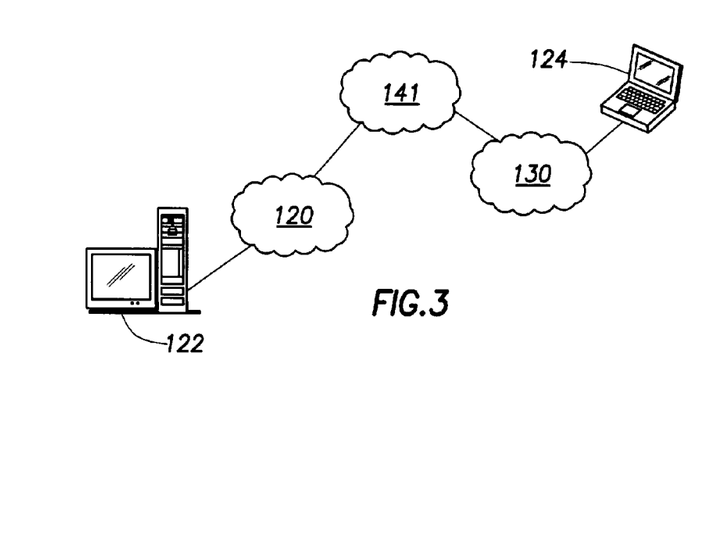
FIG. 3 is an illustration of two connected networks.

FIG. 3 depicts network A 120 connected to network B 130 by the Internet 141. Laptop 124 is connected to network B 130. Desktop 122 is connected to network A 120. Laptop 124 and desktop 122 may be connected to each other by VNRS program 400 residing in the memory of desktop 122 and in the memory of laptop 124.

Figure 4:
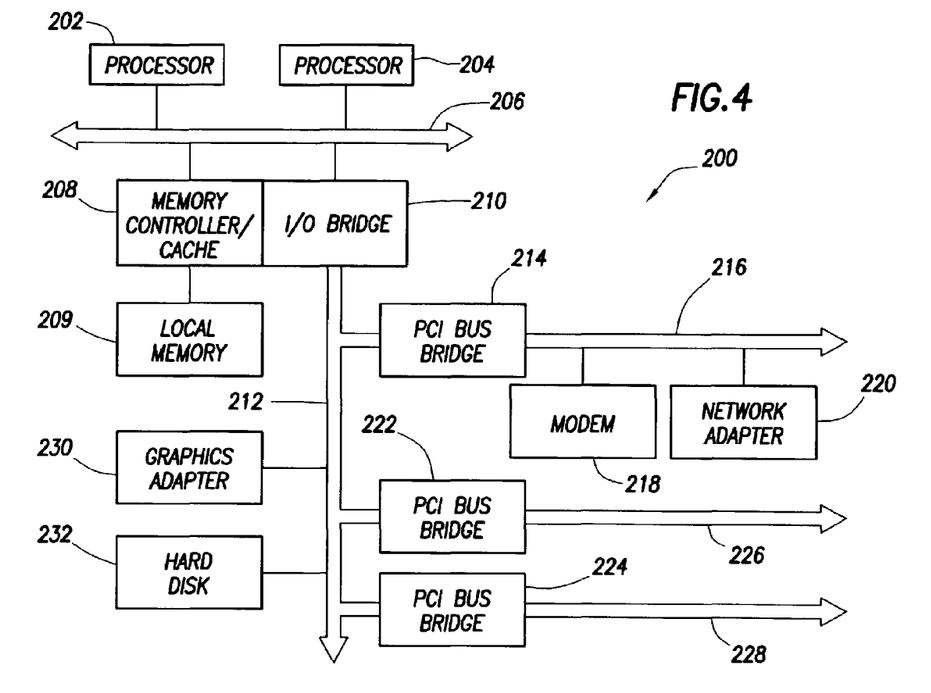
FIG. 4 is an illustration of a distributed data processing system.

Referring to FIG. 4, a block diagram depicts a data processing system 200, which may be implemented as a server, such as server 104 in FIG. 2 in accordance with the present invention. Data processing system 200 may be a symmetric multiprocessor (SMP) system including a plurality of processors such as first processor 202 and second processor 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. First peripheral component interconnect (PCI) bus bridge 214 connected to I/O bus 212 provides an interface to first PCI local bus 216. Modem 218 may be connected to first PCI local bus 216. Typical PCI bus implementations will support four PCI expansion slots or add-in connectors. Communications links to network computers 108, 110, 112 and 114 in FIG. 4 may be provided through modem 218 and network adapter 220 connected to first PCI local bus 216 through add-in boards. Additional PCI bus bridges such as second PCI bus bridge 222 and third PCI bus bridge 224 provide interfaces for additional PCI local buses such as second PCI local bus 226 and third PCI local bus 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 4 may vary. For example, other peripheral devices, such as an optical disk drive and the like also may be used in addition or in place of the hardware depicted. The depicted example is not meant to imply architectural limitations with respect to the present invention. The data processing system depicted in FIG. 4 may be, for example, an IBM RISC/System 6000 system, a product of International Business Machines Corporation in Armonk, N.Y., running the Advanced Interactive Executive (AIX) operating system.

Figure 5:
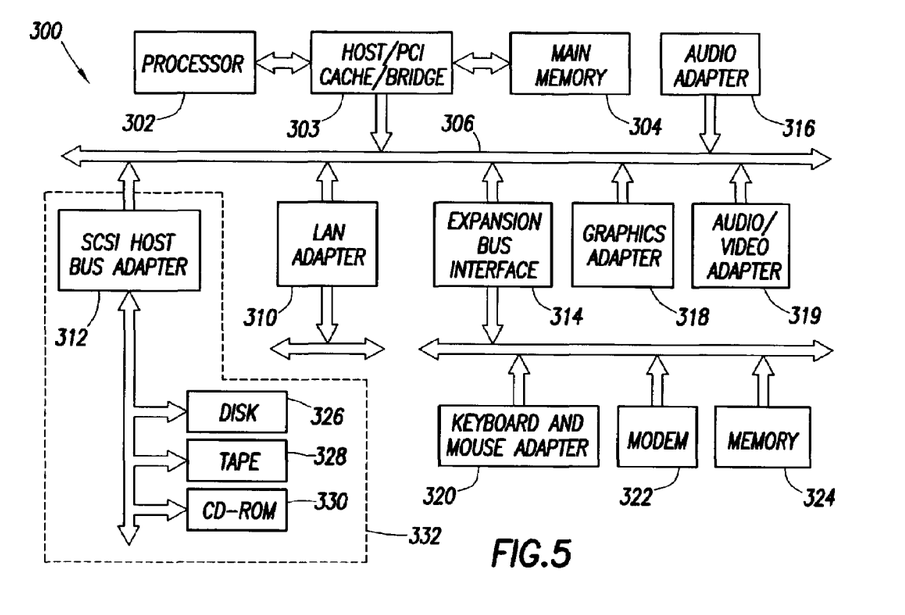
FIG. 5 is an illustration of a data processing system.

With reference now to FIG. 5, a block diagram illustrates a data processing system 300 in which the invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 303. PCI bridge 303 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 5. The operating system may be a commercially available operating system such as Microsoft Windows or OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Incorporated. Instructions for the operating system, the object-oriented operating system, and applications or programs may be located on storage devices, such as hard disk drive 326, and they may be loaded into main memory 304 for execution by processor 302.

Those of ordinary skill in the art will appreciate that the hardware in FIG. 5 may vary depending on the implementation. Other internal hardware or peripheral devices, such as flash ROM (or equivalent nonvolatile memory) or optical disk drives and the like, may be used in addition to or in place of the hardware depicted in FIG. 5. Also, the processes of the present invention may be applied to a multiprocessor data processing system. For example, data processing system 300, if configured as a network computer, may not include SCSI host bus adapter 312, hard disk drive 326, tape drive 328, and CD-ROM 330, as noted by the box with the dotted line in FIG. 5 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data. The depicted example in FIG. 5 and above-described examples are not meant to imply architectural limitations with respect to the present invention. It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

Figure 6:
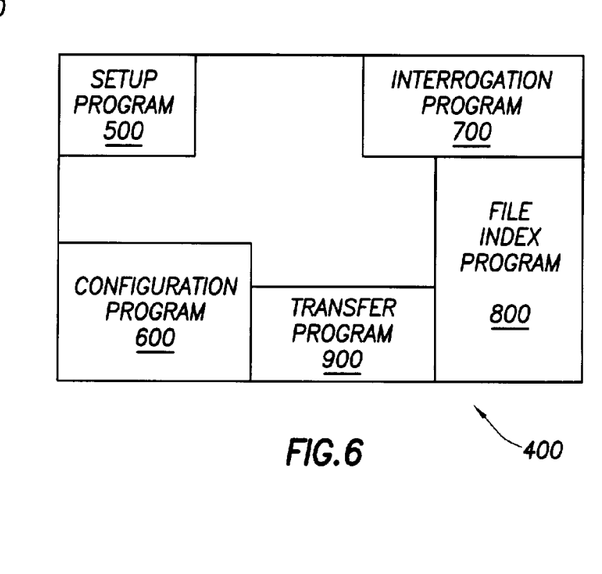
FIG. 6 is an illustration of a VNRS program.

FIG. 6 is a depiction of VNRS program 400. VNRS program 400 comprises setup program 500, interrogation program 700, transfer program 900, file index program 800 and configuration program 600.

Figure 7:
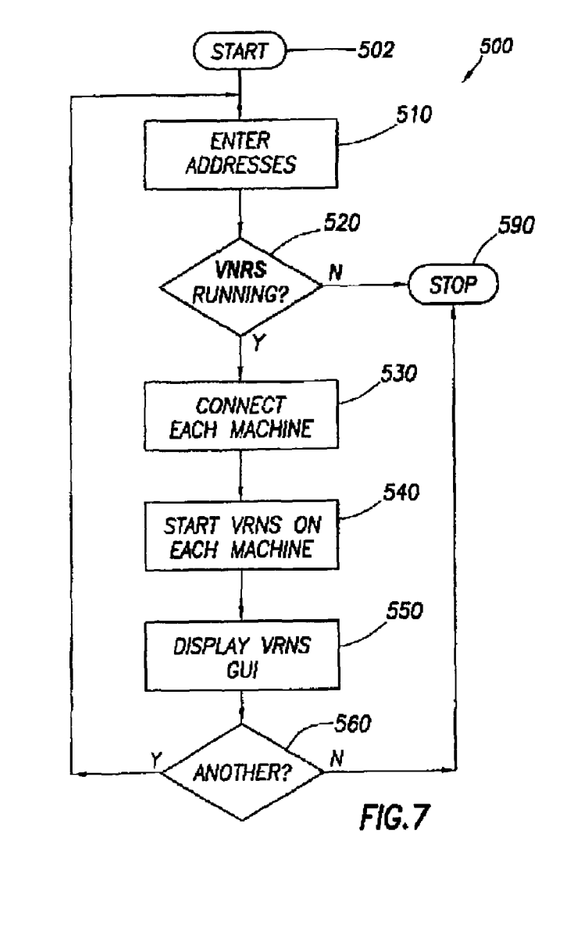
FIG. 7 is a flowchart of the setup program.

FIG. 7 depicts a flowchart for setup program 500. Setup program 500 is run on the local machine and connects the other machines to the local machine via a virtual network. Alternatively, the machines could be connected via a traditional LAN or WAN. Setup program 500 begins (502) and the user enters the IP addresses for the machines in the network (510). A determination is made as to whether VNRS program 400 is running on the local machine (520). If not, setup program 500 ends (590). If VNRS program 400 is running, then setup program 500 connects each machine (530). Setup program 500 starts VNRS program 400 on each connected machine (540). The VNRS GUI similar to display 1000 (see FIG. 12) is displayed on the user's machine (550). A determination is made as to whether another machine is to be added (560). If not, setup program 500 ends (590). If another machine is to be added, setup program 500 goes to step 510.

Figure 8:
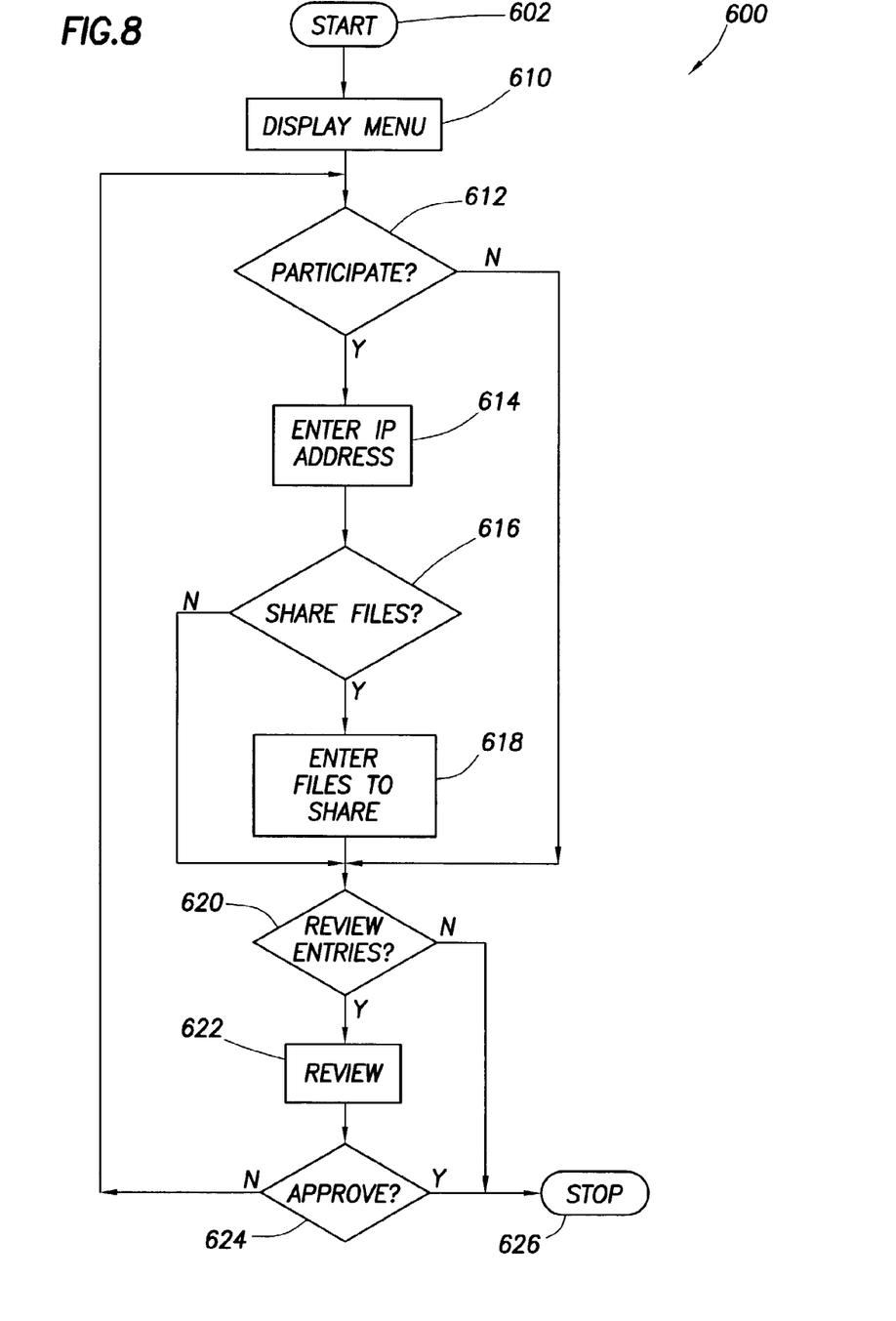
FIG. 8 is a flowchart of the configuration program.

FIG. 8 depicts a flowchart for configuration program 600. Configuration program 600 allows the user to identify the machines that will participate in file transfer. Configuration program 600 begins (602) and a menu is displayed (610). The menu lists all of the machines connected to the user's computer. The menu allows the user to identify machines that will participate in file transfer. A determination is made as to whether the user wants to participate in the VNRS network (612). If the user does not want to participate, then configuration program 600 goes to step 620. If the user wants to participate, then the user enters the IP address for the user's machine (614). Next, a determination is made as to whether the user wants share files within the network (616). If the user does not want to share files, then configuration program 600 goes to step 620. If the user wants share files, then the user manually enters the files, folders or drives to share (618). A determination is made as to whether the user wants to review the entries (620). If the user does not want to review entries, configuration program 600 ends (626). If the user wants to review entries, the entries are made available for review (622) and a determination is made as to whether the entries are approved (624). If the user approves the entries, configuration program 600 ends (626). If not, configuration program 600 goes to step 612.

Figure 9:
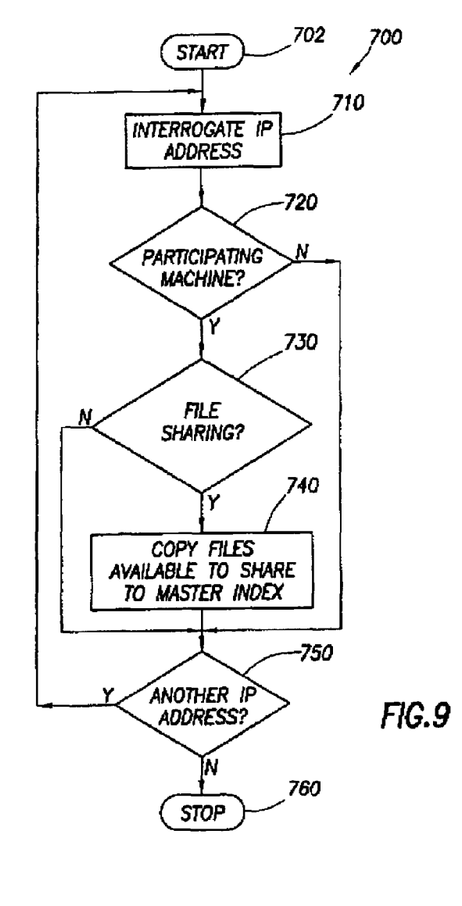
FIG. 9 is a flowchart of the interrogation program.

FIG. 9 is a flowchart of interrogation program 700. Interrogation program 700 begins (702) and interrogates all IP address in the VNRS network (710). A determination is made as to whether each IP address belongs to a participating machine (720). If not, interrogation program 700 goes to step 750. If the IP address belongs to a participating machine, a determination is made as to whether the participating machine has elected to share files, folders or drives (730). If not, interrogation program 700 proceeds to step 750. If the participating machine has elected to share files, folders, or drives, the files, folders, or drives for the machine at the IP address are copied to the host machine's master file index (740). A determination is made as to whether there is another IP address (750). If there is another IP address, then interrogation program 700 goes to step 710. If not, interrogation program 710 stops (760).

Figure 10:
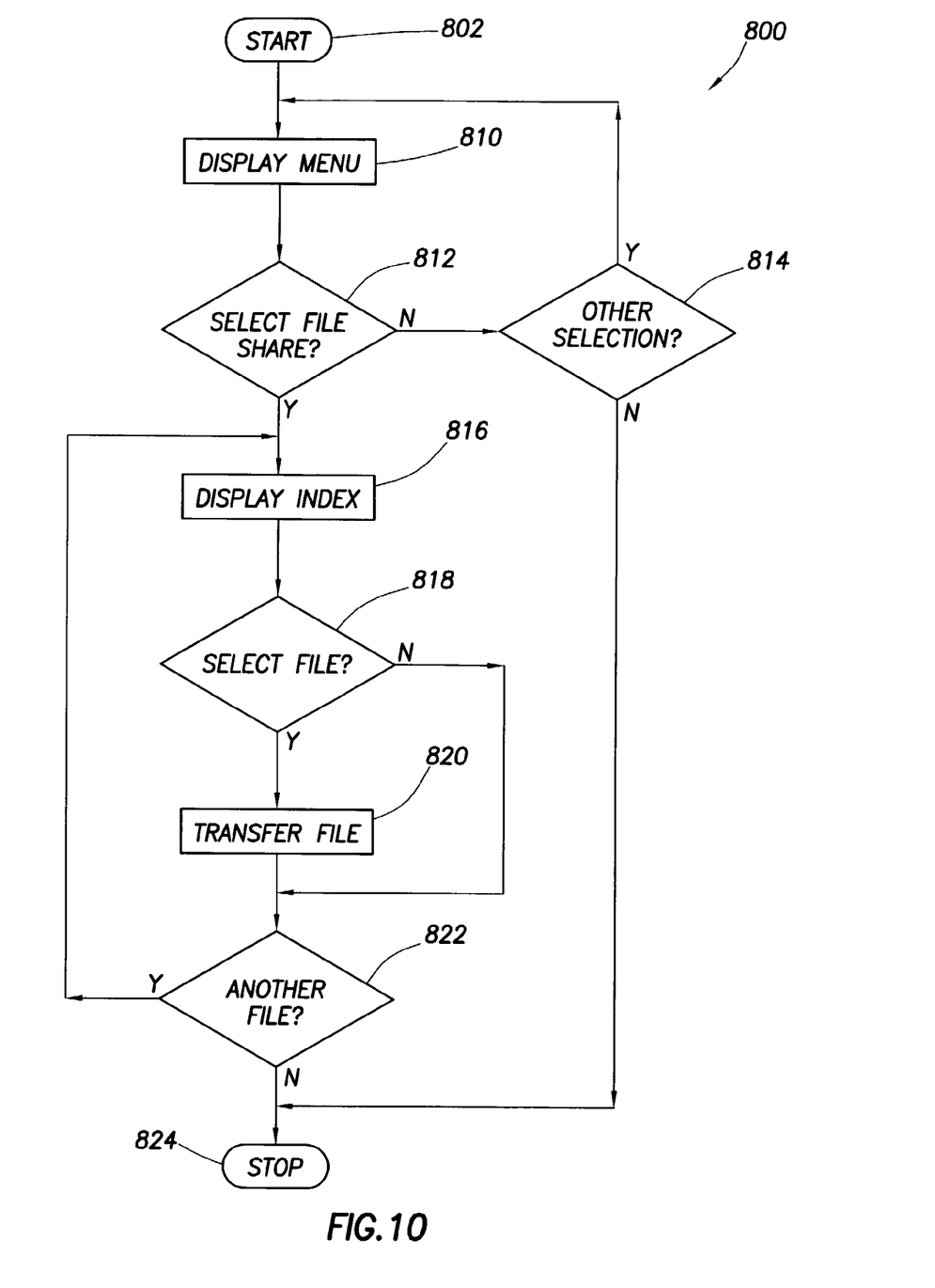
FIG. 10 is a flowchart of the file index program.

FIG. 10 is a flowchart of the file index program 800. File index program 800 begins (802) and a menu is displayed (810). A determination is made as to whether the user selected the file share option (812). If the user did not select the file share option, then a determination is made as to whether the user has selected another option (814). If the user has not selected another option, file index program ends (824). If the user has selected another option at step 814, file index program 800 goes to step 810. If the user selected the file share option at step 812, an index of available files is displayed (816). A determination is made as to whether the user selected a file (818). If not, file index program 800 goes to step 822. If the user selected a file, the file is transferred to the user's machine (820). A determination is made as to whether there is another file to be transferred (822). If not, file index program 800 ends (824). If there is another file to be transferred, file index program 800 goes to step 816.

Figure 11:
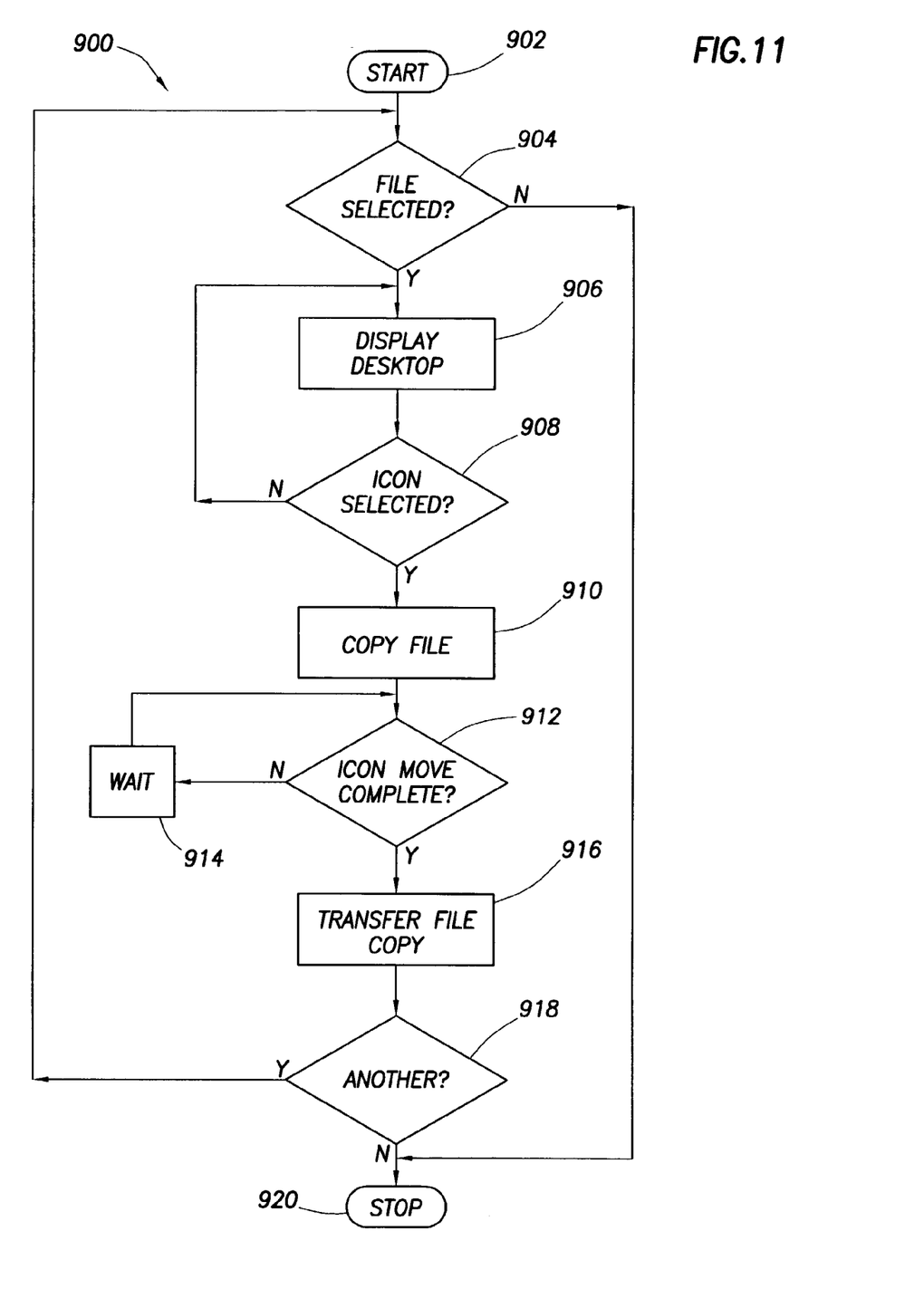
FIG. 11 is a flowchart of the transfer program.

FIG. 11 depicts a flowchart of the transfer program 900. Transfer program 900 starts (902) and a determination is made as to whether a file has been selected (904). If a file has not been selected, transfer program 900 ends (920). If a file has been selected, the desktop for the machine having the file is displayed on the desktop of the user's machine (906). A determination is made as to whether an icon has been selected on the transferred desktop (908). If an icon has not been selected, transfer program 900 goes to step 906. If an icon has been selected, the file represented by the icon is copied (910). A determination is made as to whether the icon move is completed (912). If the icon move is not completed, transfer program 900 waits (914) and then goes to step 912. If the icon move is completed, then the copy of the file is transferred from the client computer to the host computer (916). A determination is made as to whether there is another file to transfer (918). If there is another file, transfer program 900 goes to step 904. If not, transfer program 900 stops (920).

Figure 12:
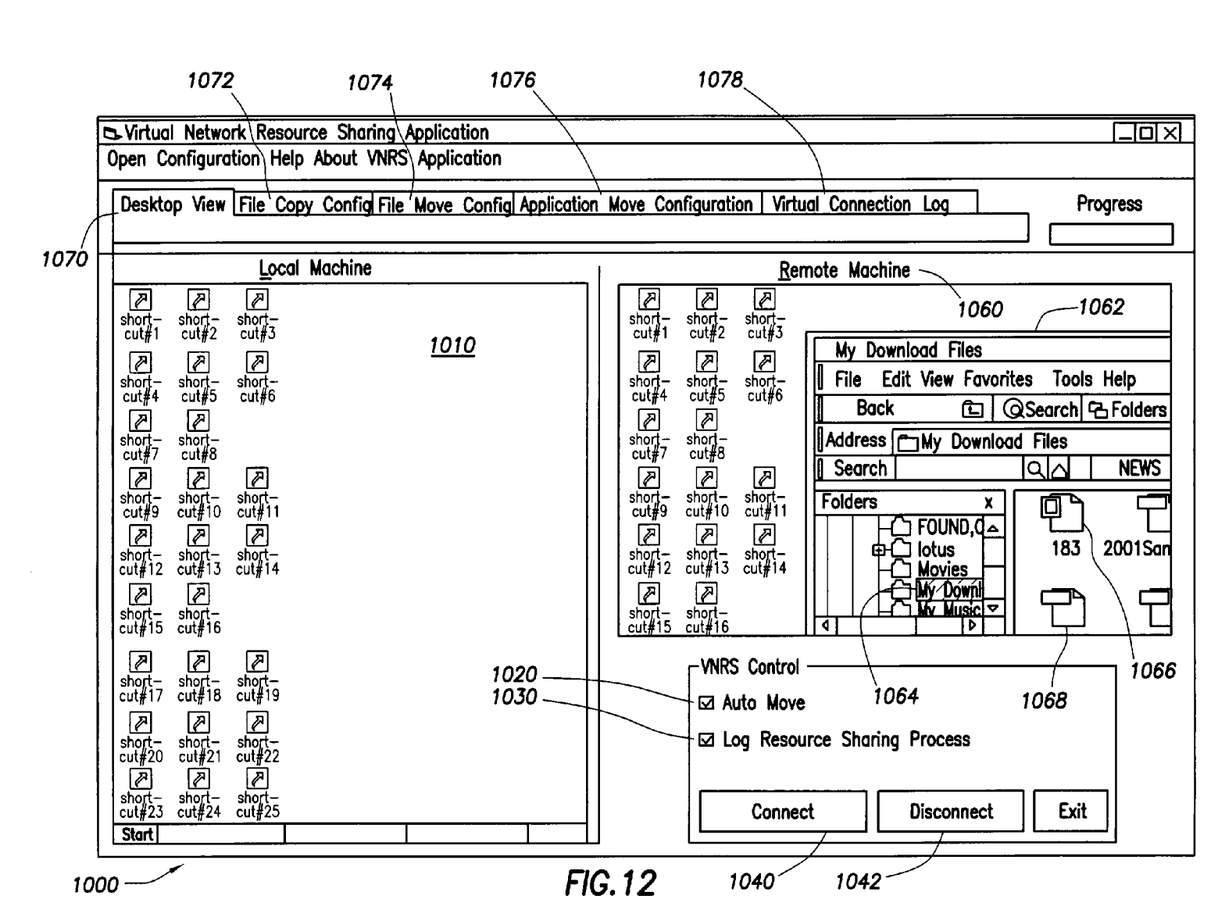
FIG. 12 depicts a local machine desktop with remote desktop simultaneously displayed.

FIG. 12 is a representation of the user's computer screen showing the local machine desktop 1010 and the remote machine desktop 1060 displayed side by side on VNRS display 1000. Specifically, the desktop view folder 1070 has been selected. VNRS display 1000 shows auto move window 1020 has been clicked on so that a check mark is displayed. When auto move window 1020 is activated by clicking on the window and causing a check mark to be displayed in auto move window 1020, a file selected from the remote machine desktop 1060, will be automatically electronically transferred from the remote machine memory to the local machine memory and the icon for the selected file will appear at the local machine desktop 1010. The electronic transfer will take place when the selected file icon has been clicked on by the user. If auto move window 1020 is not activated by clicking on the window and causing a check mark to be displayed, then files icons can only be moved from the remote machine desktop 1060 to the local machine desktop 1010 by dragging and dropping. The display also shows Log Resource Sharing Process 1030 is on. When Log Resource Sharing Process window 1030 is clicked on causing a checkmark to be displayed in the window, a record of all file transfers will be maintained. The user can connect or disconnect from VNRS using connect button 1040 and disconnect button 1042. To copy a file from one computer to another, the user moves the icon from the left desktop to the right desktop, or vice versa. VNRS program 400 automatically transfers the program from the first computer to the second computer via the virtual network. For example, file "183" 1066 and pdf file 1068 are shown in "My Download Files" window 1062. These files may be copied from remote machine desktop 1060 to local machine desktop 1010 by moving the respective icons from remote machine desktop 1060 to local machine desktop 1010.

VNRS display 1000 also has File Copy Configuration tab 1072, File Move Configuration tab 1074, Application Move Configuration tab 1076, Virtual Connection Log tab 1078. File Copy Configuration tab 1072 allows the user to set properties on a file copy action between a remote machine and a local machine. Examples of properties that may be set by the user are over-writing, converting the file to read only, placing the file in a specific directory, opening the file for editing after it has been transferred or copied to the remote or local machine, and recording the action for auto move at a different sharing session. File Move Configuration tab 1074 allows the user to set properties on a file move action between a remote machine and a local machine. Examples of properties that may be set are over-writing, removing the instance of the file to be moved from the local machine or remote machine and then performing a move, and recording the action for auto move at a different sharing session. Application Move Configuration tab 1076 allows the user to set properties on an application move between a remote machine and a local machine. Examples of properties that may be set are removing the instance of the application from the registry of the local and/or remote machine and removing the instance of the application from the local and/or remote machine. Virtual Connection Log tab 1078 allows the user to set the connection of the application. For example, the user can set up the application so that it automatically connects anytime it is on a network. In addition, the user can set the properties so that the application prompts for a remote machine at all times.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A method of sharing files between a plurality of non-physically connected computers comprising:

using a virtual network resource sharing program on a host computer and a plurality of client computers, electronically connecting the host computer to each of the plurality of client computers by a virtual network;

using a graphical user interface of the virtual network resource sharing program on the host computer, selecting a desktop view folder, selecting a client computer having at least one file from the plurality of client computers, and activating an auto move checkbox on the desktop view folder;

responsive to selecting the client computer, simultaneously displaying a host computer desktop and an exact copy of an original client computer desktop on the desktop view folder of the graphical user interface;

responsive solely to a single user action of clicking on a selected file icon on the exact copy of the original client computer desktop, automatically and directly transferring a file represented by the selected file icon from the client computer to the host computer via the virtual network and automatically displaying the selected file icon on the host computer desktop on the desktop view folder of the graphical user interface;

responsive to activating a log resource sharing process checkbox on the desktop view folder, maintaining a record of all file transfers conducted on the desktop view folder;

using a file copy configuration tab on the graphical user interface, setting a first plurality of properties for a file copy action between the client computer and the host computer including over-writing, converting the file to read only, placing the file in a specific depository, opening the file for editing after it has been copied, and recording the file copy action for an auto move at a different sharing session;

using a file move configuration tab, setting a second plurality of properties on a file move action including over-writing, removing an instance of the file, and recording the file move action for the auto move at the different sharing session;

using an application move configuration tab on the graphical user interface, setting a third plurality of properties on an application move including removing an instance of an application from the registry of the client computer; and using a virtual connection log tab, setting up the application so that it automatically connects anytime it is on a network, and so that the application prompts for a remote machine at all times.

2. The method of claim 1 further comprising:
when the auto move checkbox on the graphical user interface has not been activated, automatically and directly transferring the selected file from the client computer to the host computer via the virtual network solely by dragging and dropping the selected file icon from the exact copy of the original client computer desktop to the client computer desktop.

* * * * *